United States Patent
Lim et al.

(10) Patent No.: US 10,358,991 B2
(45) Date of Patent: Jul. 23, 2019

(54) METHOD OF PROTECTING FRICTIONAL ELEMENT OF CLUTCH FOR AUTOMATIC TRANSMISSION

(71) Applicant: Hyundai Autron Co., Ltd., Seongnam-si (KR)

(72) Inventors: Kwang Hyuk Lim, Suwon-si (KR); Chang Kyu Shin, Gunpo-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 318 days.

(21) Appl. No.: 15/334,637

(22) Filed: Oct. 26, 2016

(65) Prior Publication Data

US 2017/0122238 A1   May 4, 2017

(30) Foreign Application Priority Data

Oct. 28, 2015 (KR) .................... 10-2015-0150477

(51) Int. Cl.
  *F02D 41/02* (2006.01)
  *F02D 41/12* (2006.01)
  *F16H 63/50* (2006.01)
  *F16H 61/12* (2010.01)

(52) U.S. Cl.
  CPC ....... *F02D 41/022* (2013.01); *F02D 41/0215* (2013.01); *F02D 41/12* (2013.01); *F16H 61/12* (2013.01); *F16H 63/50* (2013.01); *F02D 2200/101* (2013.01); *F02D 2250/26* (2013.01); *F16H 2061/124* (2013.01); *F16H 2061/1276* (2013.01); *F16H 2063/508* (2013.01)

(58) Field of Classification Search
  None
  See application file for complete search history.

(56) References Cited

U.S. PATENT DOCUMENTS

| | | | |
|---|---|---|---|
| 2003/0125161 A1* | 7/2003 | Tokura | F16H 61/061 477/176 |
| 2011/0166758 A1* | 7/2011 | Otanez | F16H 61/143 701/67 |
| 2015/0369361 A1* | 12/2015 | Matsubara | F16H 61/143 477/169 |

FOREIGN PATENT DOCUMENTS

| | | |
|---|---|---|
| JP | 5-106729 A | 4/1993 |
| JP | 2008-240561 A | 10/2008 |
| KR | 10-2005-0046188 A | 5/2005 |
| KR | 10-2007-0103517 A | 10/2007 |
| KR | 10-2014-0078442 A | 6/2014 |

* cited by examiner

*Primary Examiner* — Jacob S. Scott
(74) *Attorney, Agent, or Firm* — Morgan, Lewis & Bockius LLP

(57) ABSTRACT

A method of protecting a frictional element of a clutch for an automatic transmission includes calculating an equivalent rotation number X of a frictional element using a trigonometric function equation on the basis of a virtual right triangle, if a rotation number of an engine exceeds a predetermined boundary value during a driving in a constant speed stage over a predetermined shift stage of an automatic transmission, entering a frictional element protection mode, if the equivalent rotation number X of the frictional element exceeds a predetermined critical value in a state in which the control unit enters the frictional element protection mode, reducing the rotation number of the engine by applying a target engine torque limiting value.

7 Claims, 3 Drawing Sheets

METHOD OF PROTECTING FRICTIONAL ELEMENT OF CLUTCH FOR AUTOMATIC TRANSMISSION

CROSS-REFERENCE TO RELATED APPLICATION

The present application claims priority under 35 U.S.C 119(a) to Korean Application No. 10-2015-0150477, filed on Oct. 28, 2015, which is herein incorporated by reference in its entirety.

BACKGROUND OF THE INVENTION

Various embodiments of the present disclosure relate to an automatic transmission for a vehicle, and more particularly, to a method of protecting a frictional element of a clutch for the automatic transmission, which can prevent the damage of the frictional element by calculating a rotation number of the frictional element and reducing the rotation number of an engine when the rotation number of the frictional element exceeds the burn time of the frictional element, in an automatic transmission which does not have a speed sensor for measuring the rotation number of the frictional element.

RELATED ART

In general, a 4-speed or 4-stage automatic transmission is composed of a planetary gear, frictional elements for controlling each element of the planetary gear to realize the 4-speed, such as an under drive clutch (UDC), an over drive clutch (ODC), a reverse clutch (REVC), a second brake (2NDB), and a low reverse brake (LRB), a final deceleration device for finally decelerating the transmission output achieved by selective operation of the frictional elements, and a differential device for transmitting the output of the final deceleration device to a drive shaft.

In addition, generally, a 5-speed or 5-stage automatic transmission further has a separate planetary gear, a direct clutch (DIRC) for controlling each element of the planetary gear to realize the 5-speed, a one way clutch (OWC), and a reduce brake (REDB) to the configuration of the 4-speed automatic transmission.

However, the automatic transmission has a problem in that the frictional element becomes burned out when the rotation number of the engine rises excessively during driving in a constant-speed stage over a specific shift stage in which any of clutches, for example, an over drive clutch (ODC) is operated.

The damage of the frictional element can be prevented by calculating the rotation number of the frictional element using a speed sensor and detecting a burn time, that is, a critical rotation number of the frictional element to reduce the rotation number of an engine at the detected burn time of the frictional element.

However, in a transmission which does not have a speed sensor for measuring the rotation number of the frictional element, the damage of the frictional element cannot be protected or prevented because the burn time of the frictional element cannot be detected.

Accordingly, in a transmission which does not have a speed sensor for measuring the rotation number of the frictional element, a method of preventing the damage of the frictional element by estimating or calculating the rotation number of the frictional element and reducing the rotation number of an engine when the rotation number of the frictional element exceeds the burn time, that is, a critical rotation number of the frictional element, has been required.

The related art of the present disclosure is disclosed in Korean Patent Laid-open Publication No. 2005-0046188 published on May 18, 2005 and entitled "5-speed automatic transmission".

BRIEF SUMMARY

According to an embodiment, a method of protecting a frictional element of a clutch for an automatic transmission is provided. The method may comprise: calculating, by a control unit, an equivalent rotation number X of a frictional element using a trigonometric function equation on the basis of a virtual right triangle; if a rotation number of an engine exceeds a predetermined boundary value during driving in a constant speed stage over a predetermined shift stage of an automatic transmission, entering a frictional element protection mode, by the control unit; if the control unit enters the frictional element protection mode, determining whether the calculated equivalent rotation number X of the frictional element exceeds a predetermined critical value, by the control unit; and if the equivalent rotation number X of the frictional element exceeds the predetermined critical value in a state in which the control unit enters the frictional element protection mode, reducing the rotation number of the engine by applying a target engine torque limiting value, by the control unit, wherein the virtual right triangle is obtained using a rotation number Z of an output shaft, a rotation number Y of a turbine, and an equivalent rotation number X of the frictional element of the automatic transmission as a height, and using a number of teeth $\alpha$ corresponding to the turbine, a number of teeth $\beta$ corresponding to the output shaft, and a virtual extension line $\gamma$ as a base line.

The method may further comprise releasing the frictional element protection mode not to apply the target engine torque limiting value, by the control unit, if the automatic transmission is shifted under a predetermined stage, or the rotation number of the engine is below the predetermined critical value.

The predetermined shift stage may be 4-stage.

The virtual right triangle is obtained by: drawing a virtual straight line (a first height) corresponding to the equivalent rotation number of the frictional element X to correspond to the height in a Y-axis direction on the basis of a right point of the virtual right triangle, drawing a virtual straight line to correspond to the base line in an X-axis direction, wherein the virtual straight line corresponds to a sum of a number of teeth $\alpha$ corresponding to the turbine, a number of teeth $\beta$ corresponding to the output shaft, and the virtual extension line $\gamma$, drawing a virtual straight line (a second height) corresponding to a rotation number Y of the turbine at an end point of the number of teeth $\alpha$ corresponding to the turbine in a Y-axis direction, drawing a virtual straight line (a third height) corresponding to the rotation number Z of the output shaft at an end point of the number of teeth $\beta$ corresponding to the output shaft in the Y-axis direction, connecting end points of the first, second, and third heights to draw a virtual straight line corresponding to a hypotenuse of the virtual triangle, and extending the hypotenuse of the virtual triangle to a point meeting the X-axis to correspond to the base line.

A distance from the end point of the number of teeth $\beta$ corresponding to the output shaft to a vertex at which the virtual extension line of the hypotenuse meets the base line, may become a length of the virtual extension line $\gamma$.

The length of the virtual extension line γ may be calculated using the following equation 1 by the control unit.

$$1)\ Z: Y = \gamma: \gamma + \beta \rightarrow \gamma = \frac{Z \times \beta}{(Y - Z)}$$

The equivalent rotation number X of the frictional element may be calculated using the following equations 2 and 3 by the control unit.

$$2)\ Y: X = \gamma + \beta: \gamma + \beta + \alpha$$

$$3)\ X = \frac{Y\left(\alpha + \beta + \frac{Z \times \beta}{Y - Z}\right)}{\frac{Z \times \beta}{Y - Z} + \beta}$$

BRIEF DESCRIPTION OF THE DRAWINGS

Various embodiments of an inventive concept will become more apparent in view of the attached drawings and accompanying detailed description, in which.

DETAILED DESCRIPTION

Embodiments of a method of protecting a frictional element of a clutch for an automatic transmission according to the present disclosure will hereinafter be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
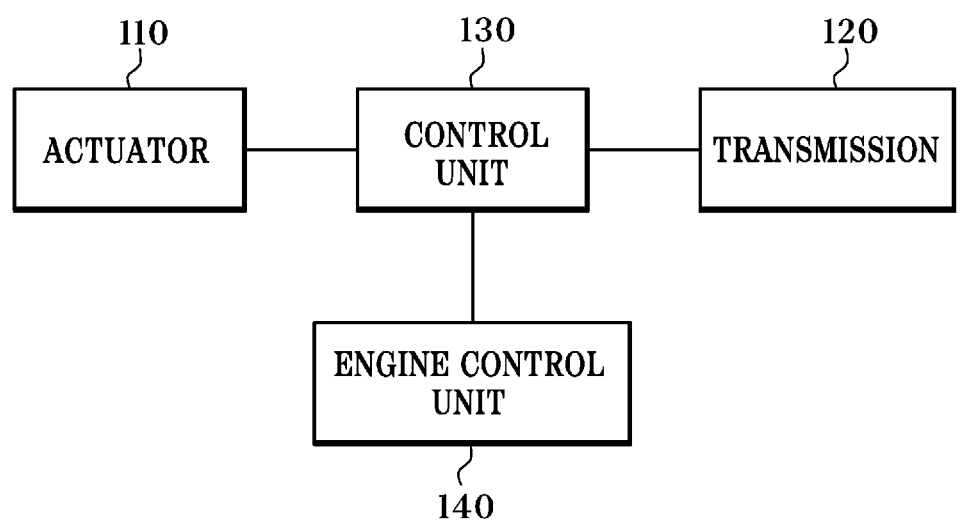
FIG. 1 is an exemplary view schematically showing a configuration of an apparatus for protecting a frictional element of a clutch for an automatic transmission relating to an embodiment of the present disclosure.

FIG. 1 is an exemplary view schematically showing a configuration of an apparatus for protecting a frictional element of a clutch for an automatic transmission relating to an embodiment of the present disclosure.

As illustrated in FIG. 1, the apparatus for protecting a frictional element of a clutch for an automatic transmission relating to an embodiment may include a clutch actuator 110 which is responsible for a clutch control, a shifting device 120 for controlling a shift fork of the transmission to perform an actual gear shift, a control unit 130, for example, a transmission control unit (TCU) for controlling the shifting device 120 in accordance with a vehicle speed, a throttle valve opening or the like, and an engine control unit (ECU) 140 for controlling an operation, for example, a rotation number of an engine in accordance with information outputted from the control unit 130.

The control unit 130, for example, TCU estimates or calculates a rotation number of the frictional element, in a transmission which does not have a speed sensor for measuring the rotation number of the frictional element of the transmission. If the estimated or calculated rotation number of the frictional element exceeds a predetermined burn time, that is a critical rotation number of the frictional element, the control unit 130 reduces the rotation number of the engine through the engine control unit (ECU) 140. Accordingly, the damage of the frictional element can be prevented.

Hereinafter, a method of protecting the frictional element by calculating the rotation number of the frictional element will be described with reference to FIGS. 2 and 3 in detail.

Figure 2:
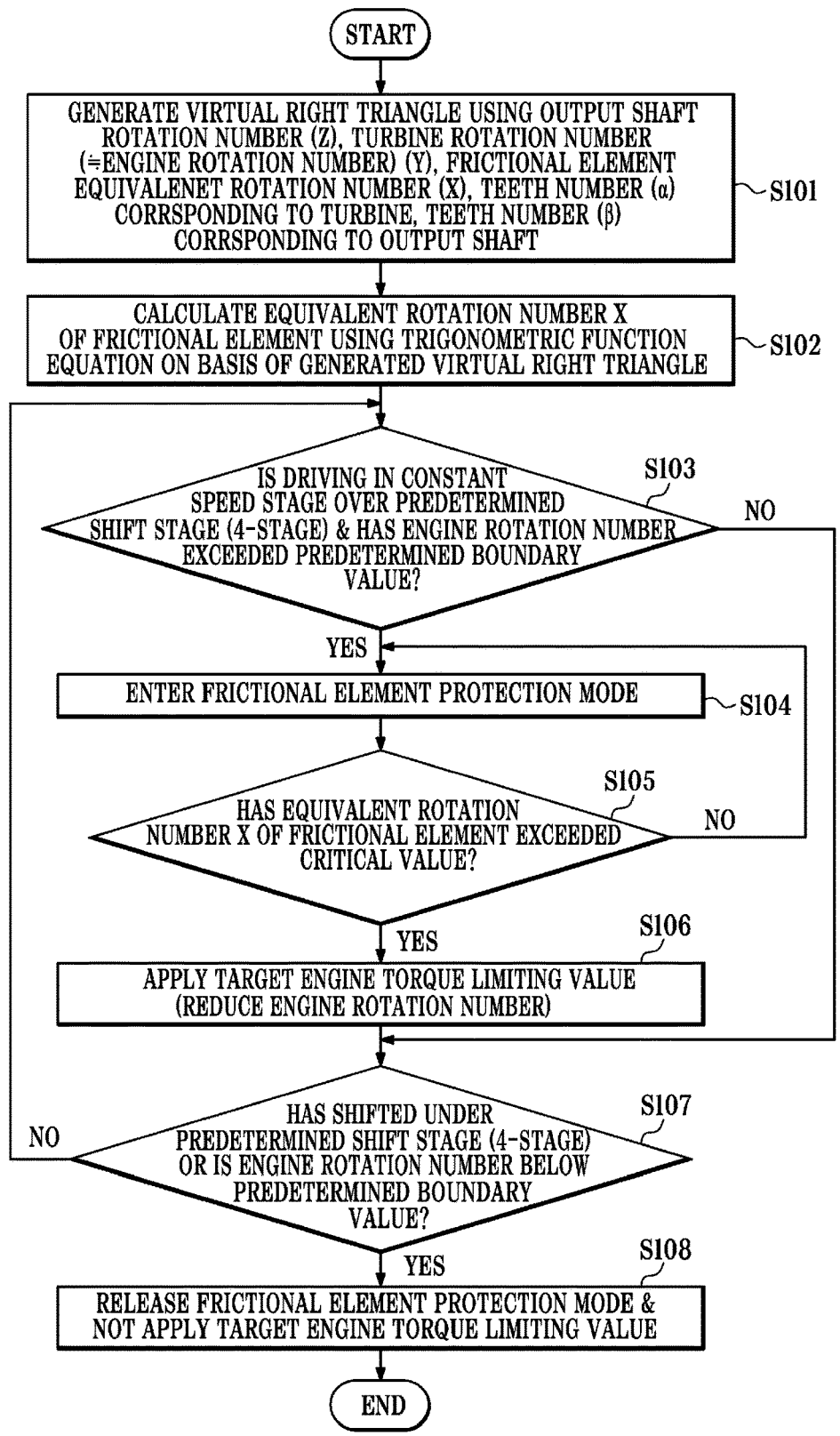
FIG. 2 is a flow chart for explaining a method of protecting a frictional element of a clutch for an automatic transmission according to an embodiment of the present disclosure.
Figure 3:
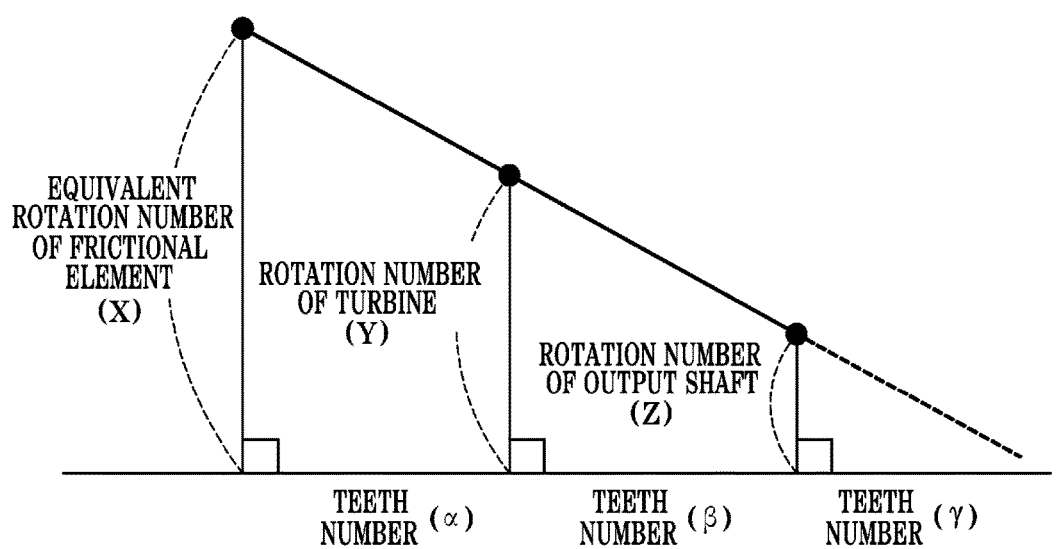
FIG. 3 is an exemplary view for explaining a method of calculating the rotation number of a frictional element in FIG. 2.

FIG. 2 is a flow chart for explaining a method of protecting a frictional element of a clutch for an automatic transmission according to an embodiment of the present disclosure, and FIG. 3 is an exemplary view for explaining a method of calculating a rotation number of the frictional element in FIG. 2.

Referring to FIG. 2, the control unit 130 generates a virtual right triangle using a rotation number Z of an output shaft, a rotation number (≈ an engine rotation number) Y of a turbine, and an equivalent rotation number X of the frictional element as a height, and using a number of teeth α corresponding to the turbine, a number of teeth β corresponding to the output shaft, and a virtual extension line γ as a base line (S101).

More specifically, referring to FIG. 3, a virtual straight line (a first height) corresponding to the equivalent rotation number X of the frictional element is drawn to correspond to a height in a Y-axis direction, and a virtual straight line corresponding to a sum of the number of teeth α corresponding to the turbine, the number of teeth β corresponding to the output shaft, and the virtual extension line γ is drawn to correspond to the base line in an X-axis direction, on the basis of a right angle point of the virtual right triangle.

Then, a virtual straight line (second height) corresponding to the rotation number Y of the turbine is drawn at an end point of the number of teeth α corresponding to the turbine in the Y-axis direction, and a virtual straight line (third height) corresponding to the rotation number Z of the output shaft is drawn at an end point of the number of teeth β corresponding to the output shaft in the y-axis direction. Then, end points of the first, second, and third heights are connected and a virtual straight line corresponding to the hypotenuse of the virtual right triangle is drawn. The hypotenuse of the virtual right triangle is extended to correspond to the base line to a point meeting the x-axis, thereby generating the virtual right triangle.

At this time, a distance from an end point of the number of teeth β corresponding to the output shaft to a vertex at which an extended line of the hypotenuse and the base line meet becomes a length of the virtual extension line γ.

As such, the base line and height are determined, and therefore, the virtual right triangle can be generated.

In accordance with this, the control unit 130 calculates the equivalent rotation number X of the frictional element using the trigonometric function equation on the basis of the generated virtual right triangle (S102).

Here, the length of the virtual extension line γ may be calculated by following equation 1). Also, if the length of the virtual extension line γ is calculated, the total length of the base line of the virtual right triangle can be obtained, and therefore, the equivalent rotation number X of the frictional element corresponding to the height of the virtual right triangle can be calculated through following equations 2 and 3.

1) $Z: Y = \gamma: \gamma + \beta \rightarrow \gamma = \dfrac{Z \times \beta}{(Y - Z)}$ 2) $Y: X = \gamma + \beta: \gamma + \beta + \alpha$ 3) $X = \dfrac{Y\left(\alpha + \beta + \dfrac{Z \times \beta}{Y - Z}\right)}{\dfrac{Z \times \beta}{Y - Z} + \beta}$ Next, the control unit 130 determines whether the rotation number of the engine exceeds a predetermined boundary value during driving in a constant speed stage over a predetermined shift stage, for example, 4-stage of the automatic transmission (S103).

According to a result of the determination of operation S103, if the rotation number of the engine exceeds the predetermined boundary value during driving in a constant speed stage over a predetermined shift stage, for example, 4-stage, the control unit 130 enters a frictional element protection mode (S104).

However, according to the result of the determination of operation S103, if the automatic transmission is shifted under the predetermined shift stage, for example, 4-stage, or the rotation number of the engine is below the predetermined boundary value, the control unit 130 checks the current shift stage and the rotation number of the engine again (S107).

If the control unit 130 enters the frictional element protection mode as described above, the control unit 130 determines whether the calculated equivalent rotation number X of the frictional element exceeds the predetermined critical value (S105).

In a state in which the control unit 130 enters the frictional element protection mode, if the equivalent rotation number X of the frictional element exceeds the predetermined critical value, the control unit 130 reduces the rotation number of the engine by applying a target engine torque limiting value through the engine control unit (ECU) 140 (S106).

Meanwhile, the automatic transmission is shifted under the predetermined stage, for example, 4-stage or the rotation number of the engine is below the predetermined critical value, the control unit 130 releases the frictional element protection mode and does not apply the target engine torque limiting value (S108).

If the automatic transmission is not shifted under the predetermined stage, for example, 4-stage, or the rotation number of the engine is maintained an excess state of the predetermined boundary value, the control unit 130 checks the current shift stage and engine rotation number again (S103).

As described above, according to an embodiment of the present disclosure, in an automatic transmission which does not have a speed sensor for measuring the rotation number of the frictional element, the damage of the frictional element can be prevented by calculating the rotation number of the frictional element, and reducing the rotation number of the engine if the rotation number exceeds the burn time of the frictional element.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. A method of protecting a frictional element of a clutch for an automatic transmission, comprising:
   calculating, by a control unit, an equivalent rotation number X of a frictional element using a trigonometric function equation on the basis of a virtual right triangle;
   if a rotation number of an engine exceeds a predetermined boundary value during driving in a constant speed stage over a predetermined shift stage of an automatic transmission, entering a frictional element protection mode, by the control unit;
   if the control unit enters the frictional element protection mode, determining whether the calculated equivalent rotation number X of the frictional element exceeds a predetermined critical value, by the control unit; and
   if the equivalent rotation number X of the frictional element exceeds the predetermined critical value in a state in which the control unit enters the frictional element protection mode, reducing the rotation number of the engine by applying a target engine torque limiting value, by the control unit,
   wherein the virtual right triangle is obtained using a rotation number Z of an output shaft, a rotation number Y of a turbine, and an equivalent rotation number X of the frictional element of the automatic transmission as a height, and using a number of teeth α corresponding to the turbine, a number of teeth β corresponding to the output shaft, and a virtual extension line γ as a base line.

2. The method of claim 1, further comprising releasing the frictional element protection mode not to apply the target engine torque limiting value, by the control unit, if the automatic transmission is shifted under a predetermined stage, or the rotation number of the engine is below the predetermined critical value.

3. The method of claim 1, wherein the predetermined shift stage is $4^{th}$-stage.

4. The method of claim 1, wherein the virtual right triangle is obtained by:
   drawing a virtual straight line (a first height) corresponding to the equivalent rotation number of the frictional element X to correspond to the height in a Y-axis direction on the basis of a right point of the virtual right triangle,
   drawing a virtual straight line to correspond to the base line in an X-axis direction, wherein the virtual straight line corresponds to a sum of a number of teeth α corresponding to the turbine, a number of teeth β corresponding to the output shaft, and the virtual extension line γ,
   drawing a virtual straight line (a second height) corresponding to a rotation number Y of the turbine at an end point of the number of teeth α corresponding to the turbine in a Y-axis direction,
   drawing a virtual straight line (a third height) corresponding to the rotation number Z of the output shaft at an end point of the number of teeth β corresponding to the output shaft in the Y-axis direction,
   connecting end points of the first, second, and third heights to draw a virtual straight line corresponding to a hypotenuse of the virtual triangle, and
   extending the hypotenuse of the virtual triangle to a point meeting the X-axis to correspond to the base line.

5. The method of claim 4,
   wherein a distance from the end point of the number of teeth β corresponding to the output shaft to a vertex at which the virtual extension line of the hypotenuse meets the base line, becomes a length of the virtual extension line γ.

6. The method of claim 4,
wherein the length of the virtual extension line γ is calculated using the following equation 1 by the control unit.

1) $Z: Y = \gamma: \gamma + \beta \rightarrow \gamma = \dfrac{Z \times \beta}{(Y-Z)}$

7. The method of claim 4,
wherein the equivalent rotation number X of the frictional element is calculated using the following equations 2 and 3 by the control unit.

2) $Y: X = \gamma + \beta: \gamma + \beta + \alpha$

3) $X = \dfrac{Y\left(\alpha + \beta + \dfrac{Z \times \beta}{Y - Z}\right)}{\dfrac{Z \times \beta}{Y - Z} + \beta}$

\* \* \* \* \*